(12) United States Patent
Wang et al.

(10) Patent No.: US 12,348,026 B1
(45) Date of Patent: Jul. 1, 2025

(54) POWER-FAILURE HOLD CIRCUIT, POWER SUPPLY PROTECTION METHOD AND APPARATUS, AND POWER SUPPLY CONTROL CIRCUIT

(71) Applicant: SUZHOU METABRAIN INTELLIGENT TECHNOLOGY CO., Jiangsu (CN)

(72) Inventors: Lingyan Wang, Jiangsu (CN); Deyang Hua, Jiangsu (CN); An Wu, Jiangsu (CN); Dongyu Zhang, Jiangsu (CN); Jianyu Li, Jiangsu (CN)

(73) Assignee: SUZHOU METABRAIN INTELLIGENT TECHNOLOGY CO., Jiangsu (CN)

( * ) Notice: Subject to any disclaimer, the term of this patent is extended or adjusted under 35 U.S.C. 154(b) by 0 days.

(21) Appl. No.: 19/115,737

(22) PCT Filed: Jan. 11, 2024

(86) PCT No.: PCT/CN2024/071735
§ 371 (c)(1),
(2) Date: Mar. 26, 2025

(87) PCT Pub. No.: WO2024/255230
PCT Pub. Date: Dec. 19, 2024

(30) Foreign Application Priority Data

Jun. 13, 2023 (CN) .......................... 202310695687.4

(51) Int. Cl.
*H02H 7/00* (2006.01)
*G06F 1/30* (2006.01)
(Continued)

(52) U.S. Cl.
CPC ................. *H02H 7/20* (2013.01); *G06F 1/30* (2013.01); *H02J 7/0063* (2013.01)

(58) Field of Classification Search
None
See application file for complete search history.

(56) References Cited

U.S. PATENT DOCUMENTS 9,313,034 B2 * 4/2016 Tao ..................... H04L 43/0817
11,936,175 B2 * 3/2024 Yang .................... H02H 11/002
(Continued)

FOREIGN PATENT DOCUMENTS

CN 113746328 A 12/2021
CN 116436146 A 7/2023

*Primary Examiner* — Stephen W Jackson
(74) *Attorney, Agent, or Firm* — IPro, PLLC

(57) ABSTRACT

A power-fail hold-up circuit includes: a first energy storage circuit, including multiple capacitors connected in parallel, the multiple capacitors being used to store energy and to provide reverse power to the server; a second energy storage circuit, including an inductor and a first switching transistor, wherein the inductor and the first switching transistor are sequentially connected in series between a positive pole of the input bus and a negative pole of the input bus, and the inductor is used to store energy to boost a voltage to a target voltage; and a third energy storage circuit, including a second switching transistor and an energy storage capacitor, wherein the second switching transistor and the energy storage capacitor are sequentially connected in series between the inductor and the negative pole, the inductor is used to charge the energy storage capacitor, and the energy storage capacitor provides reverse power to the server.

20 Claims, 6 Drawing Sheets

(51) Int. Cl.
*H02H 7/20* (2006.01)
*H02J 7/00* (2006.01)

(56) References Cited

U.S. PATENT DOCUMENTS

| | | | |
|---|---|---|---|
| 2021/0159720 A1* | 5/2021 | Yen | G11C 5/141 |
| 2021/0234366 A1* | 7/2021 | Danilovic | H02M 1/08 |
| 2023/0275422 A1* | 8/2023 | Holveck | H02H 7/20 |
| | | | 361/87 |

* cited by examiner

POWER-FAILURE HOLD CIRCUIT, POWER SUPPLY PROTECTION METHOD AND APPARATUS, AND POWER SUPPLY CONTROL CIRCUIT

CROSS-REFERENCE TO RELATED APPLICATION

This application claims the priority of the Chinese Patent application filed on Jun. 13, 2023 before the CNIPA, China National Intellectual Property Administration with the application number of 202310695687.4, and the title of "POWER-FAIL HOLD-UP CIRCUIT, POWER SUPPLY PROTECTION METHOD AND APPARATUS, AND POWER SUPPLY CONTROL CIRCUIT", which is incorporated herein in its entirety by reference.

FIELD

The present application relates to a power-fail hold-up circuit, a power supply protection method and apparatus, and a power supply control circuit.

BACKGROUND

With the continuous development of the power source business, servers have increasingly high requirements for the continuous stability of the power source. When the input voltage of the server drops abnormally or malfunctions, the system needs to quickly report and store the operating status of the system, abnormal network voltage, etc. within the power-fail hold-up time, and switch to the backup power supply mode. Therefore, it needs to install a power-fail hold-up circuit in the power supply system of the server to ensure that the server has a power-fail hold-up time.

In related art, in order to ensure that the server has the power-fail hold-up time, a large-capacitance electrolytic capacitor is connected in parallel to an input end of a direct current switch-mode power supply of the server. When the input voltage of the server drops abnormally or malfunctions, the large-capacitance electrolytic capacitor may be used to supply power to the server, thereby meeting the demand that the server has the power-fail hold-up time.

However, the inventor realized that, by using this method to supply power to the server, when the input voltage of the server drops abnormally or malfunctions, the voltage difference between the internal voltage of the server and the voltage released by the large-capacitance electrolytic capacitor is too large, which may cause a large input surge current of the server, thereby affecting the safety of the server. Therefore, there is an urgent need for a power-fail hold-up circuit to meet the demand that the server has the power-fail hold-up time and ensure the safety of the server.

SUMMARY

According to various embodiments of the present application, in a first aspect, a power-fail hold-up circuit is provided, and the power-fail hold-up circuit includes:
  a first energy storage circuit, including a plurality of capacitors connected in parallel, wherein the plurality of capacitors are used to store energy according to a voltage of an input bus of a server and to provide reverse power to the server;
  a second energy storage circuit, including an inductor and a first switching transistor, wherein the inductor and the first switching transistor are sequentially connected in series between a positive pole of the input bus and a negative pole of the input bus, and the inductor is used to store energy to boost the voltage to a target voltage; and
  a third energy storage circuit, including a second switching transistor and an energy storage capacitor, wherein the second switching transistor and the energy storage capacitor are sequentially connected in series between the inductor and the negative pole of the input bus, the inductor is used to charge the energy storage capacitor, and the energy storage capacitor provide reverse power to the server.

According to various embodiments of the present application, in a second aspect, a power supply protection method is provided, which is applied to the power-fail hold-up circuit according to the above first aspect or any corresponding embodiment, and the method includes:
  detecting a voltage signal on the input bus of the server; and
  when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit.

According to various embodiments of the present application, in a third aspect, a power supply control circuit is provided, and the power supply control circuit is used to control a power-fail hold-up circuit to provide reverse power to the server, the power-fail hold-up circuit is the power-fail hold-up circuit according to the above first aspect or any corresponding embodiment, and the power supply control circuit includes:
  a first driving circuit, including a first power source, a first switching switch, a second switching switch, a first control drive unit of the third switching transistor, a first delay unit and a second control drive unit of the second switching transistor, wherein the first power source, the first switching switch, the second switching switch, the first delay unit and the second control drive unit are sequentially connected in series, the first control drive unit is connected between the second switching switch and the first delay unit, the first power source is used to supply power to the first driving circuit, the first control drive unit is used to control the third switching transistor to be in a on state or an off state, and the second control drive unit is used to control the second switching transistor to be in the on state;
  an input voltage detection unit, connected to the input bus, and used to detect a voltage on the input bus;
  an input voltage determination unit, wherein a first end of the input voltage determination unit is connected to the input voltage detection unit, a second end of the input voltage determination unit is connected to the second switching switch, and the input voltage determination unit is used to compare magnitude of a first voltage of the plurality of capacitors in the first energy storage circuit with a first voltage threshold, and used to control the second switching switch to be in the on state or control the second switching switch to be in the off state according to a first comparison result, wherein the first comparison result is a comparison result between the first voltage and the first voltage threshold;
  a capacitor voltage detection unit, connected to the energy storage capacitor in the third energy storage circuit, wherein the capacitor voltage detection unit is used to detect a second voltage of the energy storage capacitor; and a capacitor voltage determination unit, wherein a first end of the capacitor voltage determination unit is connected to the capacitor voltage detection unit, a second end of the capacitor voltage determination unit is connected to the second switching switch, the capacitor voltage determination unit is used to compare magnitude of the second voltage and a second voltage threshold, used to control the first switching switch to be in the on state or control the first switching switch to be in the off state according to a second comparison result; the second comparison result is a comparison result between the second voltage and the second voltage threshold.

According to various embodiments of the present application, in a fourth aspect, a power supply protection apparatus is provided, and the apparatus includes:

a detection module, configured for detecting a voltage signal on the input bus of the server; and a control module configured for, when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit.

According to various embodiments of the present application, in a fifth aspect, a server is provided, and the server includes: a memory and a processor, the memory and the processor are connected in communication with each other, computer instructions are stored in the memory, and the processor, by executing the computer instructions, executes the power supply protection method according to the above second aspect or any corresponding embodiment.

According to various embodiments of the present application, in a sixth aspect, a non-transitory computer-readable storage medium is provided, the non-transitory computer-readable storage medium stores computer instructions for causing a computer to execute the power supply protection method according to the above second aspect or any corresponding embodiment.

BRIEF DESCRIPTION OF THE DRAWINGS

In order to provide a clearer explanation of the specific implementation methods in the present application or technical solutions in the related art, a brief introduction will be given to the accompanying drawings required for description of the specific implementation methods or the related art. It is obvious that the accompanying drawings in the following description are some implementation methods of the present application. For those skilled in the art, other drawings may be obtained based on these drawings without creative work.

DESCRIPTION OF REFERENCE NUMERALS

Figure 1:
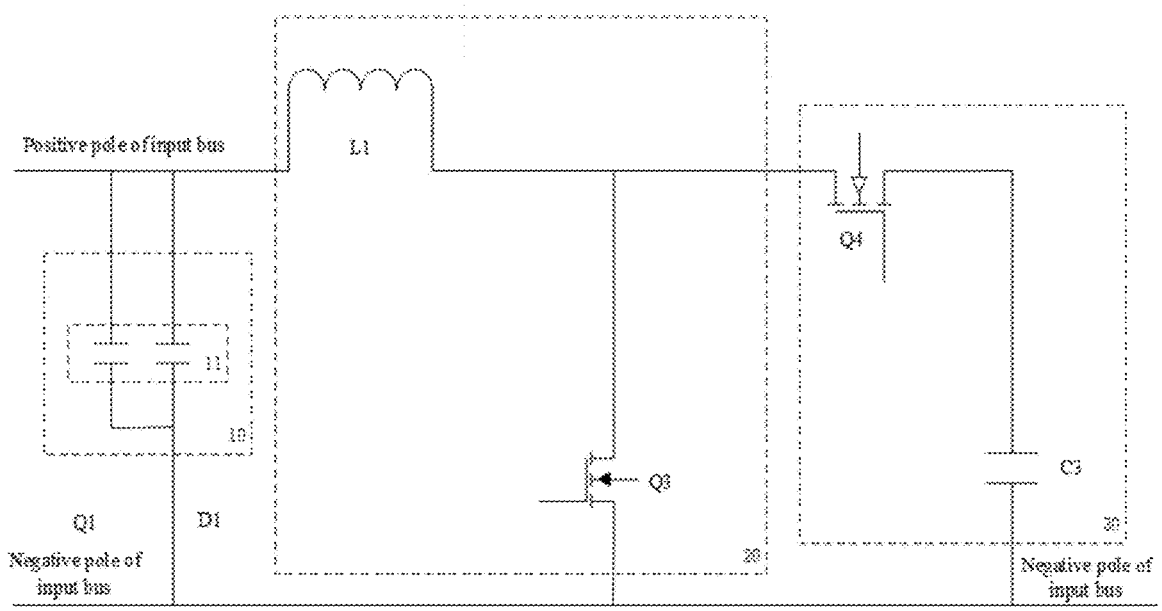
FIG. 1 is a schematic structural diagram of a power-fail hold-up circuit according to an embodiment of the present application.

10: first energy storage circuit; 20: second energy storage circuit; 30: third energy storage circuit;
11: a plurality of capacitors; 21: magnetic core; 40: magnetic saturation control module;
710: first driving circuit; 720: input voltage detection unit; 730: input voltage determination unit;
711: first power source; 712: first switching switch; 713: second switching switch;
714: first control drive unit; 715: first delay unit; 716: second control drive unit;
740: capacitor voltage detection unit; 750: capacitor voltage determination unit; 760: second driving circuit;
761: second power source; 762: third switching switch; 763: fourth switching switch;
764: second delay unit; 765: third control drive unit.

DETAILED DESCRIPTION

In order to make the purposes, technical solutions, and advantages of the embodiments of the present application clearer, the following will provide a clear and complete description of the technical solution in the embodiments of the present application in conjunction with the accompanying drawings. Obviously, the described embodiments are a part of the embodiments of the present application, not all of them. Based on the embodiments in the present application, all other embodiments obtained by those skilled in the art without creative work are within the scope of protection of the present application.

In related art, in order to ensure that the server has a power-fail hold-up time, a large-capacitance electrolytic capacitor is connected in parallel to an input end of a direct current switch-mode power supply of the server. When the input voltage of the server drops abnormally or malfunctions, the large-capacitance electrolytic capacitor may be used to supply power to the server, thereby meeting the demand that the server has the power-fail hold-up time.

However, this type of capacitor has a large volume, usually about ¼ of the overall volume of the power source of the server, and as the output power increases, it will reach ⅓ of the overall volume to meet the necessary requirements, which has seriously restricted the development of high-efficiency and high power density of the power source of the server. And when the input voltage of the server drops abnormally or malfunctions, the voltage difference between the internal voltage of the server and the voltage released by the large-capacitance electrolytic capacitor is too large, which may cause a large input surge current of the server, thereby affecting the safety of the server.

In view of this, an embodiment of the present application provides a power-fail hold-up circuit, including: a first energy storage circuit, including a plurality of capacitors connected in parallel, wherein the plurality of capacitors are used to store energy according to a voltage of an input bus of a server and to provide reverse power to the server; a second energy storage circuit, including an inductor and a first switching transistor, wherein the inductor and the first switching transistor are sequentially connected in series between a positive pole of the input bus and a negative pole of the input bus, and the inductor is used to store energy to boost the voltage to a target voltage; and a third energy storage circuit, including a second switching transistor and an energy storage capacitor, wherein the second switching transistor and the energy storage capacitor are sequentially connected in series between the inductor and the negative pole of the input bus, the inductor is used to charge the energy storage capacitor, and the energy storage capacitor provides reverse power to the server. Through the power-fail hold-up circuit provided in the present application, the plurality of energy storage circuits may be used to store energy based on the voltage of the input bus of the server. When the input voltage of the server drops abnormally or malfunctions, the fluctuation voltage of the input bus may be smoothed, thereby meeting the demand for providing the power-fail hold-up time for the server and ensuring the safety of the server.

An embodiment of the present application provides a power-fail hold-up circuit, as shown in FIG. 1, including: a first energy storage circuit 10, a second energy storage circuit 20 and a third energy storage circuit 30.

The first energy storage circuit 10 includes a plurality of capacitors 11 connected in parallel.

In the embodiment of the present application, in order to meet the demand of energy storage and avoid the size of the power-fail hold-up circuit being too large, the first energy storage circuit 10 is constructed by connecting the plurality of capacitors 11 in parallel. This allows the plurality of capacitors 11 to store energy based on the voltage of the input bus of the server, and to provide reverse power to the server when the voltage of the input bus drops abnormally or malfunctions. Moreover, using the plurality of capacitors 11 connected in parallel helps to supply power to the server by the first energy storage circuit 10 when the voltage of the input bus drops abnormally or malfunctions, this may smooth voltage fluctuations on the input bus, thereby ensuring the safety of the server.

The second energy storage circuit 20 includes an inductor L1 and a first switching transistor Q3, the inductor L1 and the first switching transistor Q3 are sequentially connected in series between a positive pole of the input bus and a negative pole of the input bus.

In the embodiment of the present application, the second energy storage circuit 20 may be understood as a boost energy storage circuit. The inductor L1 may boost the voltage flowing into the input bus to the target voltage, so that the third energy storage circuit 30 may store high-voltage electrical energy in advance when the voltage of the input bus is in a normal state, and provide sufficient power-fail hold-up time for the server when supplying power to the server in the future.

Furthermore, the inductor L1 may be understood as a boost inductor with low power requirements and low design difficulty. An inductance design value of the inductor L1 takes into account the requirements of current limiting characteristics, and may achieve a brief current limiting function during power-fail hold-up. Subsequently, when switching to the energy storage capacitor C3 to supply power to the server through the input bus, it may suppress the surge current caused on the input bus, thereby helping to enhance the reliability of the power-fail hold-up circuit.

Moreover, disposing the second energy storage circuit 20 in the power-fail hold-up circuit instead of placing it on the main power branch of the server may reduce the power required by the second energy storage circuit 20, thereby enhancing the reliability of the power-fail hold-up circuit and helping to reduce the volume occupation of the second energy storage circuit 20.

The third energy storage circuit 30 includes a second switching transistor Q4 and an energy storage capacitor C3, wherein the second switching transistor Q4 and the energy storage capacitor C3 are sequentially connected in series between the inductor L1 and the negative pole of the input bus, the inductor L1 is used to charge the energy storage capacitor C3.

In the embodiment of the present application, the third energy storage circuit 30 is used to store high-voltage electrical energy and to provide reverse power to the server when the voltage of the input bus drops abnormally or malfunctions. Due to the fact that the energy storage of the capacitor satisfies the following energy formula:

$$E = \frac{1}{2}CU^2.$$

Therefore, when the energy storage capacitor C3 uses the target voltage to store energy, the stored electrical energy will be higher than the electrical energy required by the server. When the voltage on the input bus drops abnormally or malfunctions, the energy storage capacitor C3 may provide the required energy supply for the server, thereby helping to provide sufficient power-fail hold-up time for the server.

The power-fail hold-up circuit provided in this embodiment may store energy according to the voltage of the input bus of the server through the plurality of energy storage circuits when the input voltage of the server is in the normal state. It may also provide reverse power to the server through the first energy storage circuit and/or the second energy storage circuit when the input voltage of the server drops abnormally or malfunctions, thus effectively reducing the surge current on the input bus. It may meet the demand for providing power-fail hold-up time for the server, ensure the safety of the server, and occupy a small volume, which helps to ensure the development of high-efficiency and high power density of the power source of the server.

Figure 2:
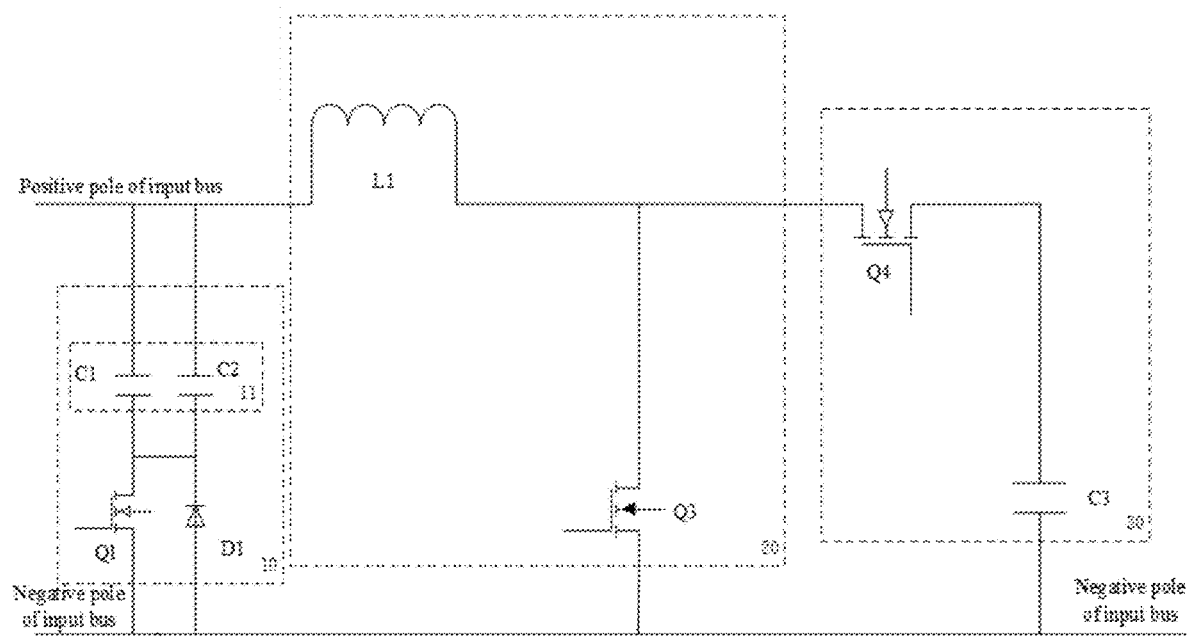
FIG. 2 is a schematic structural diagram of another power-fail hold-up circuit according to an embodiment of the present application.

As shown in FIG. 2, the plurality of capacitors 11 includes a first capacitor C1 and a second capacitor C2 connected in parallel with the first capacitor C1; the first energy storage circuit 10 further includes: a third switching transistor Q1 and a diode D1. The first capacitor and the third switching transistor Q1 are sequentially connected in series between the positive pole of the input bus and the negative pole of the input bus. In practical applications, the source of the third switching transistor Q1 may be connected to output terminals of the plurality of capacitors 11 (the first capacitor C1 and the second capacitor C2), and the drain of the third switching transistor Q1 may be connected to the negative pole of the input bus. Alternatively, the drain of the third switching transistor Q1 may also be connected to the output terminals of the plurality of capacitors 11 (the first capacitor C1 and the second capacitor C2), and the source of the third switching transistor Q1 may be connected to the negative pole of the input bus. The specific connection method depends on the usage requirements and this is not limited in the present application.

A positive pole of the diode D1 is connected to the negative pole of the input bus. The second capacitor C2 is connected in series between the positive pole of the input bus and a negative pole of the diode D1. The charging or discharging states of the plurality of capacitors 11 may be controlled through the third switching transistor Q1, thereby enabling targeted control of the plurality of capacitors 11 based on the voltage state of the input bus. By setting the diode D1, it may ensure that when the first energy storage circuit 10 supplies power to the server through the input bus, the plurality of capacitors 11 are always in a discharging state, thereby avoiding reverse power supply and helping to extend the power-fail hold-up time.

In some embodiments, the first capacitor C1 and the second capacitor C2 are used to store energy according to the voltage of the input bus of the server when the third switching transistor Q1 is in a on state; and the first capacitor C1 and the second capacitor C2 are further used to provide reverse power to the server when the third switching transistor Q1 is in an off state and the diode D1 is in a unidirectional conduction state.

When the third switching transistor Q1 is in the on state, the first energy storage circuit 10 is connected in series between the positive pole of the input bus and the negative pole of the input bus, thereby enabling energy storage based on the voltage of the input bus of the server. Furthermore, during a process where the input bus continuously supplies power to the first capacitor C1 and the second capacitor C2, when the first capacitor C1 and the second capacitor C2 are in a saturation state, they may be equivalent to the voltage of the input bus, thereby supplying power to the inductor L1 or the energy storage capacitor C3.

When the third switching transistor Q1 is in the off state and the diode D1 is in the unidirectional conduction state, the plurality of capacitors 11 are in the discharging state, which may provide reverse power supply to the server to maintain the power demand on the load side of the server.

Moreover, in this case, since the plurality of capacitors 11 is unable to continue charging, during a process of switching the power supply circuit to the first energy storage circuit to provide reverse power to the server, it may significantly reduce the energy and time of surge currents on the input bus, thereby solving the problem of the energy storage capacitor C3 being unable to directly switch in parallel to the input bus.

Furthermore, since the diode D1 is in the first energy storage circuit 10, the discharge path may be maintained continuously, which may reduce the time requirement for the instantaneous switching of the energy storage capacitor C3 and help ensure the reliability for determining the switching state. The diode D1 is also used to provide sufficient input load to maintain energy during power-fail switching.

In some other embodiments, when the third switching transistor Q1 is in the on state, the first switching transistor Q3 and the second switching transistor Q4 alternately conduct in a specified duty cycle period for the inductor L1 to charge the energy storage capacitor C3.

When the third switching transistor Q1 is in the on state, the first switching transistor Q3 and the second switching transistor Q4 alternately conduct in the specified duty cycle period for the inductor L1 to charge the energy storage capacitor C3. For example, a single specified duty cycle includes a first duty cycle and a second duty cycle, an execution period of the first duty cycle is earlier than that of the second duty cycle. The first duty cycle is used to control whether the first switching transistor Q3 is in the on state, and the second duty cycle is used to control whether the second switching transistor Q4 is in the on state. Since the target voltage of the energy storage capacitor C3 is provided by the inductor L1, and when the first switching transistor Q3 and the second switching transistor Q4 are both in the on state, it will cause the energy storage capacitor C3 to be short circuited. Therefore, in order to ensure that the inductor L1 may charge the energy storage capacitor C3 with the target voltage through the second switching transistor Q4, the first switching transistor Q3 and the second switching transistor Q4 are controlled to alternate conduction, to use the characteristic of high internal resistance and slow self-discharge of the energy storage capacitors, to control the second energy storage circuit 20 to enter the standby shutdown self-discharge state for a long time, thereby reducing the overall light load power consumption of the power source and minimizing electromagnetic interference caused by the addition of the high-frequency circuits.

In one or more implementation scenarios, the alternating frequency between the first switching transistor Q3 and the second switching transistor Q4 may be in the range of 300 kHz~500 kHz, thereby reducing the inductance requirement for the inductor L1 and facilitating the integration design with the inductance required for current limiting of the inductor. Moreover, by integrating the second energy storage circuit with the energy storage capacitor, the number of power device applications may be minimized, thereby further improving the power density of the power source.

Figure 3:
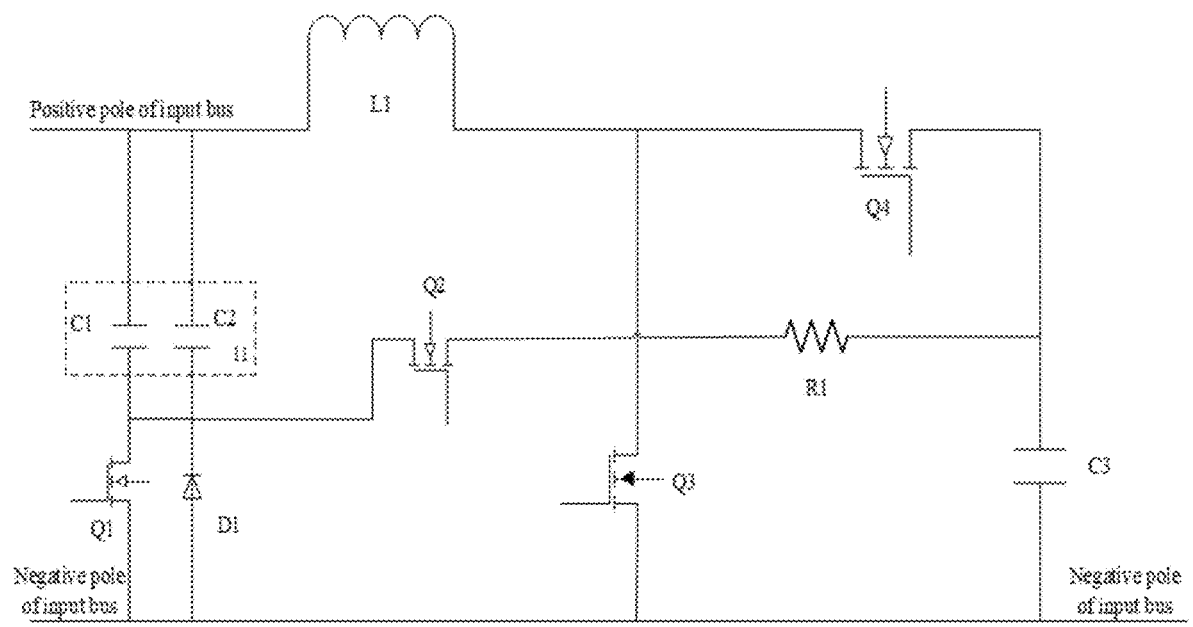
FIG. 3 is a schematic structural diagram of yet another power-fail hold-up circuit according to an embodiment of the present application.

As shown in FIG. 3, the power-fail hold-up circuit further includes a current limiting resistor R1 and a fourth switching transistor Q2; one end of the current limiting resistor R1 is disposed between the second switching transistor Q4 and the energy storage capacitor C3; and the fourth switching transistor Q2 is connected in series between the other end of the current limiting resistor R1 and the negative pole of the diode D1. So that when the energy of the first capacitor, the second capacitor C2, and the energy storage capacitor C3 is released to the operating undervoltage threshold, the energy storage capacitor C3 may be connected in series with the first capacitor and the second capacitor C2 based on the current limiting resistor R1 and the fourth switching transistor Q2 to increase the power supply voltage of the power-fail hold-up circuit to the server through the input bus (for example, after connecting the energy storage capacitor C3 in series with the first capacitor and the second capacitor C2, the output voltage of the power-fail hold-up circuit may be increased by about twice), thereby ensuring that the stored electrical energy in the first capacitor and the second capacitor C2, and the energy storage capacitor C3 is fully utilized, which helps to shorten the power supply switching time. Thus, it may effectively extend the power-fail hold-up time to ensure the stable operation of the server.

In some embodiments, when the second switching transistor Q4 is in a on state, and the first switching transistor Q3, the third switching transistor Q1 and the fourth switching transistor Q2 are all in an off state, the energy storage capacitor C3 and the plurality of capacitors 11 are connected in parallel to provide reverse power to the server, to extend the duration for providing the power-fail hold-up time to the server.

When the first switching transistor Q3, the second switching transistor Q4 and the third switching transistor Q1 are in the off state, the fourth switching transistor Q2 is in the on state and the diode D1 is in a unidirectional conduction state, the energy storage capacitor C3 and the plurality of capacitors 11 are connected in series to provide reverse power to the server, to maximize the utilization of the electrical energy from the plurality of capacitors 11 and the energy storage capacitor C3, and extend the duration for providing the power-fail hold-up time to the server. Furthermore, during a process where the energy storage capacitor C3 is connected in series with the plurality of capacitors 11 to release energy, the large capacitor on the input bus may be cut off during the process of switching the power supply circuit of the server to the power-fail hold-up circuit to supply power to the server. This ensures that there are no large-capacitance energy storage capacitors on a branch of the input bus, thus, the surge energy on the input bus is small and has a short existence time when the power supply circuit is switched, and the current limiting resistor R1 also has a current limiting effect, thereby effectively ensuring the safety for providing reverse power to the server.

Figure 4:
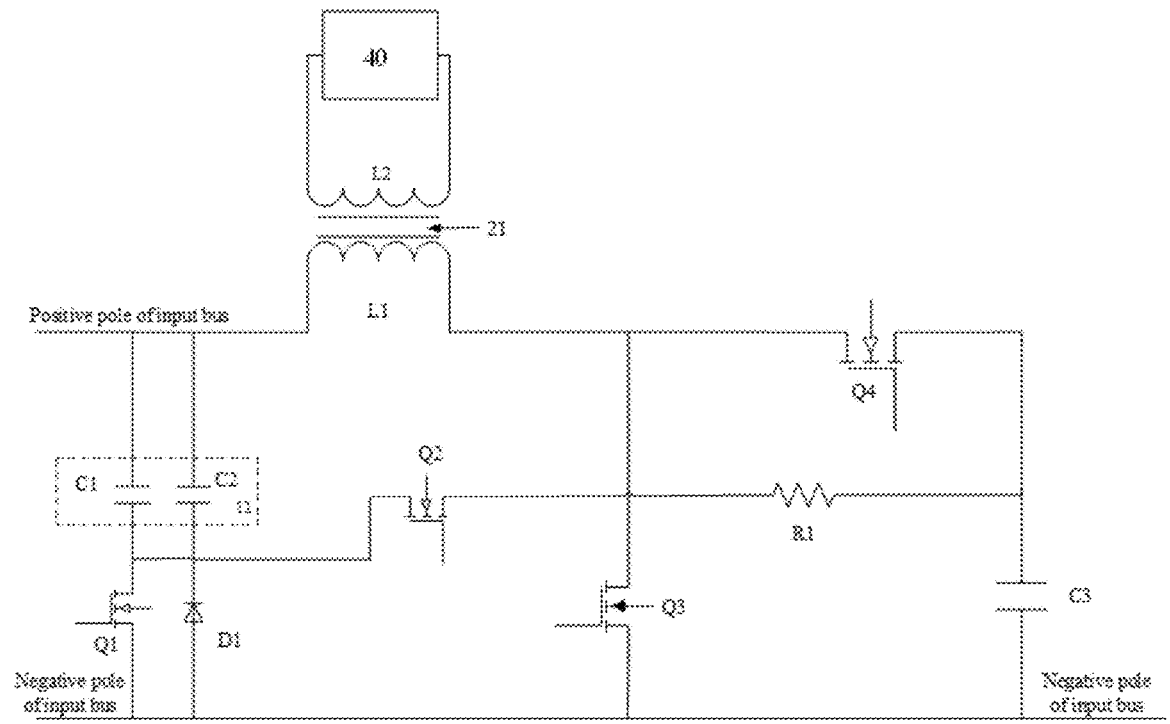
FIG. 4 is a schematic structural diagram of still another power-fail hold-up circuit according to an embodiment of the present application.

As shown in FIG. 4, the inductor L1 is an energy storage current limiting coil; and the second energy storage circuit 20 further includes: a magnetic saturation control module 40, an excitation saturation coil L2 and a magnetic core 21; the energy storage current limiting coil L1, the magnetic core 21 and the excitation saturation coil L2 form a coupled inductor; and the magnetic saturation control module 40 is configured for controlling a current in the excitation saturation coil L2, the current is used to control the energy storage current limiting coil L1 to be in a current limiting state or control the energy storage current limiting coil to be in a saturation state. By utilizing the principle of magnetic integration to control the charging and discharging states of the energy storage capacitor C3, the design difficulty is low. It may not only achieve a brief current limiting function of the energy storage current limiting coil L1 during power-fail hold-up, but also suppress the surge current generated on the input bus when the energy storage capacitor C3 is switched to the main power path.

In some embodiments, when the second switching transistor Q4 is in a on state and the third switching transistor Q1 is in an off state, the energy storage current limiting coil L1 is used to charge the energy storage capacitor C3 in the current limiting state; and when the second switching transistor Q4 is in the on state, the third switching transistor Q1 is in the off state and the diode D1 is in a unidirectional conduction state, the energy storage capacitor C3 is used to provide reverse power to the server when the energy storage current limiting coil L1 is in the saturation state. Due to the slow self-discharge rate of the energy storage capacitor C3, it may control whether the energy storage capacitor C3 is in a self-discharge state by controlling whether the energy storage current limiting coil L1 is in an inductive saturation state, thereby reducing the inductance requirement for the inductor L1 and facilitating the integration design with the inductance required for the current limiting of the inductor L1. At the same time, entering the shutdown self-discharge state for a long time may reduce the overall light load power consumption of the power source by the second energy storage circuit and minimize electromagnetic interference caused by the addition of the high-frequency circuits, thereby enhancing the stability of the server.

Moreover, when the energy storage capacitor C3 switches to the main power path of the server, by controlling the current of the excitation saturation coil L2, the energy storage current limiting coil L1 is triggered to be in the saturation state. It may also fully parallel the energy storage capacitor C3 to the input bus path, and the current in the capacitor on the input bus may release energy by flowing through the diode D1 to provide power supply hold-up services for the server.

Through the power-fail hold-up circuit provided in the present application, it may not only store energy when the voltage of the input bus is in the normal state, but also provide necessary power-fail hold-up time for the server when the input voltage of the server drops abnormally or malfunctions, assist the server in reporting faults and storing necessary information, and be able to switch to backup power supply timely, thus making it more applicable and reliable.

Based on the same inventive concept, the present application also provides a power supply protection method, which may be applied to any of the power-fail hold-up circuits provided in the present application, and the power supply protection method includes: detecting a voltage on the input bus of the server; and when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit. Through the power supply protection method provided in the present application, it may smooth the fluctuation voltage of the input bus when the voltage of the input bus of the server drops abnormally or malfunctions, provide the server with the required power-fail hold-up time, and ensure the safety of the server.

According to the embodiments of the present application, a power supply protection method embodiment is provided. It should be noted that the steps shown in the flow chart of the accompanying drawings may be executed in a computer system such as a set of computer-executable instructions, and although the logical order is shown in the flowchart, in some cases, the steps shown or described may be executed in a different order than here.

Figure 5:
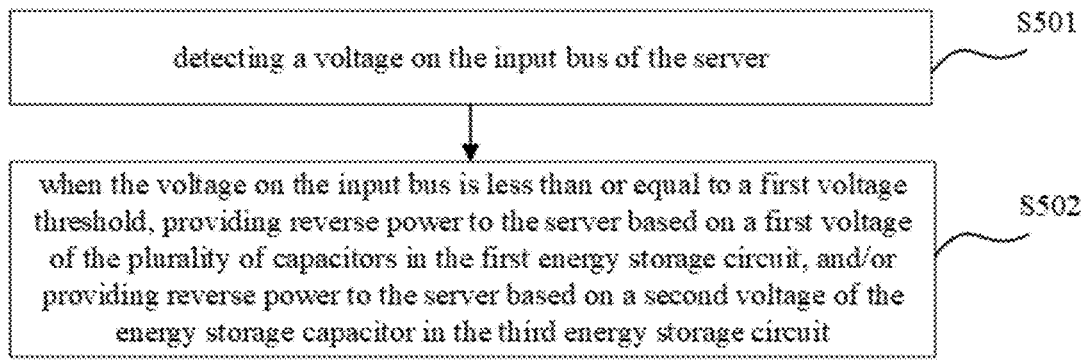
FIG. 5 is a flow chart of a power supply protection method according to an embodiment of the present application.

In this embodiment, a power supply protection method is provided, and the execution subject may be a server or a baseboard management controller (BMC) deployed inside the server. FIG. 5 is a flow chart of the power supply protection method according to the embodiment of the present application, as shown in FIG. 5, which includes the following steps:

Step S501, detecting a voltage on the input bus of the server.

In the embodiment of the present application, the purpose of detecting the voltage on the input bus is to determine whether the current voltage on the input bus is normal and whether it is capable to supply power to the server normally.

Step S502, when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit.

In the embodiment of the present application, the first voltage threshold may be understood as the warning voltage, which is the minimum voltage value required to maintain the normal operation of the server. If the voltage on the input bus is less than or equal to the first voltage threshold, it indicates that the voltage on the input bus of the server is abnormal, or there is a voltage drop occurring. Therefore, in order to ensure that the server may switch the power supply circuits timely, reverse power is supplied to the server based on the first voltage of the plurality of capacitors in the first energy storage circuit, and/or reverse power is supplied to the server based on the second voltage of the energy storage capacitor in the third energy storage circuit, to provide the power-fail hold-up time for the server.

The power supply protection method provided in the embodiment may smooth the fluctuation voltage of the input bus when the input voltage of the server drops abnormally or malfunctions, provide the server with the required power-fail hold-up time, and ensure the safety of the server.

In some embodiments, the plurality of capacitors includes a first capacitor and a second capacitor connected in parallel with the first capacitor; the first energy storage circuit further includes: a third switching transistor and a diode; the first capacitor and the third switching transistor are sequentially connected in series between the positive pole of the input bus and the negative pole of the input bus; a positive pole of the diode is connected to the negative pole of the input bus; and the second capacitor is connected in series between the positive pole of the input bus and a negative pole of the diode.

In some implementation scenarios, when the voltage on the input bus is equal to a first voltage threshold, a process of providing reverse power to the server based on a first voltage of the plurality of capacitors in the first energy storage circuit may include: when the voltage on the input bus is equal to the first voltage threshold and the second voltage of the energy storage capacitor is equal to a second voltage threshold, controlling the third switching transistor to be in an off state, to provide reverse power to the server based on the first voltage of the first capacitor and the second capacitor when the diode is in a unidirectional conduction state.

When the voltage on the input bus is equal to the first voltage threshold, it indicates that the voltage on the input bus is in a low voltage state. The second voltage threshold may be understood as the maximum voltage value when the energy storage capacitor is in a saturation state. When the second voltage is equal to the second voltage threshold, it may be determined that the energy storage capacitor is currently in the saturation state. Therefore, in order to prevent the voltage on the input bus from gradually decreasing, the third switching transistor is controlled to be in the off state, so as to provide reverse power to the server based on the first voltage of the first capacitor and the second capacitor when the diode is in the unidirectional conduction state, to smooth the voltage on the input bus and ensure the normal load power supply of the server.

In some implementation scenarios, when the voltage on the input bus is less than the first voltage threshold, a process of providing reverse power to the server based on the first voltage of the plurality of capacitors in the first energy storage circuit and the second voltage of the energy storage capacitor in the third energy storage circuit may include: when the voltage on the input bus is less than the first voltage threshold, the voltage on the input bus is greater than a third voltage threshold, and the second voltage is equal to the second voltage threshold, after controlling the third switching transistor to be in the off state for a first duration, controlling the second switching transistor in the third energy storage circuit to be in a on state, and when the first switching transistor in the second energy storage circuit is in the off state and the diode is in the unidirectional conduction state, controlling the plurality of capacitors to be connected in parallel with the energy storage capacitor, to provide reverse power to the server from the first voltage and the second voltage.

The third voltage threshold may be understood as the minimum voltage value when the plurality of capacitors are in an undervoltage state. When the voltage on the input bus is less than the first voltage threshold, the voltage on the input bus is greater than the third voltage threshold, and the second voltage is equal to the second voltage threshold, it indicates that the voltage on the input bus is gradually decreasing, but the first voltage of the plurality of capacitors has not yet reached the undervoltage state. Therefore, in order to reduce the surge current on the input bus, meet the requirement of providing power-fail hold-up time for the server, and ensure the safety of the server, the third switching transistor is controlled to be in the off state for the first duration, and then the second switching transistor in the third energy storage circuit is controlled to be in the on state. When the first switching transistor in the second energy storage circuit is in the off state and the diode is in the unidirectional conduction state, the first voltage and the second voltage jointly provide reverse power to the server. At this point, the plurality of capacitors and the energy storage capacitors are connected in parallel.

In some other embodiments, the power-fail hold-up circuit further includes: a current limiting resistor and a fourth switching transistor; one end of the current limiting resistor is disposed between the second switching transistor and the energy storage capacitor; and the fourth switching transistor is connected in series between the other end of the current limiting resistor and the negative pole of the diode.

In some implementation scenarios, a process of, when the voltage on the input bus is less than the first voltage threshold, providing reverse power to the server based on the first voltage of the plurality of capacitors in the first energy storage circuit and the second voltage of the energy storage capacitor in the third energy storage circuit may include:

when the voltage on the input bus is equal to the third voltage threshold, the second voltage is less than the second voltage threshold and the second voltage is greater than a fourth voltage threshold, continuing to control the plurality of capacitors to be connected in parallel with the energy storage capacitor, to provide reverse power to the server from the first voltage and the second voltage. The fourth voltage threshold may be understood as the minimum voltage value when the energy storage capacitor is in the undervoltage state. When the voltage on the input bus is equal to the third voltage threshold, the second voltage is less than the second voltage threshold, and the second voltage is greater than the fourth voltage threshold, it indicates that the plurality of capacitors are in the undervoltage state and their own voltage is insufficient, but the voltage of the energy storage capacitor is sufficient, thereby continuing to control the plurality of capacitors in parallel with the energy storage capacitor, and using the first voltage and second voltage to provide reverse power to the server.

When the voltage on the input bus is equal to the third voltage threshold and the second voltage is equal to the fourth voltage threshold, the second switching transistor is controlled to be in the off state, the fourth switching transistor is controlled to be in the on state after controlling the second switching transistor to be in the off state for a second duration, and the plurality of capacitors are controlled to be connected in series with the energy storage capacitor when the first switching transistor and the third switching transistor are in the off state and the diode is in the unidirectional conduction state, to provide reverse power to the server from the first voltage and the second voltage. When the voltage on the input bus is equal to the third voltage threshold and the second voltage is equal to the fourth voltage threshold, it indicates that the plurality of capacitors and the energy storage capacitor are in the undervoltage state. Therefore, in order to maximize the utilization of the voltages of the plurality of capacitors and the energy storage capacitor, the second switching transistor is controlled to be in the off state, and after the second switching transistor is in the off state for the second duration, the fourth switching transistor is controlled to be in the on state. When both the first switching transistor and the third switching transistor are in the off state, and the diode is in the unidirectional conduction state, the plurality of capacitors and the energy storage capacitor are controlled in series, and the first voltage and the second voltage are used to provide reverse power to the server, thereby releasing the stored electrical energy of the plurality of capacitors and the energy storage capacitor as much as possible, to extend the power-fail hold-up time.

Figure 6:
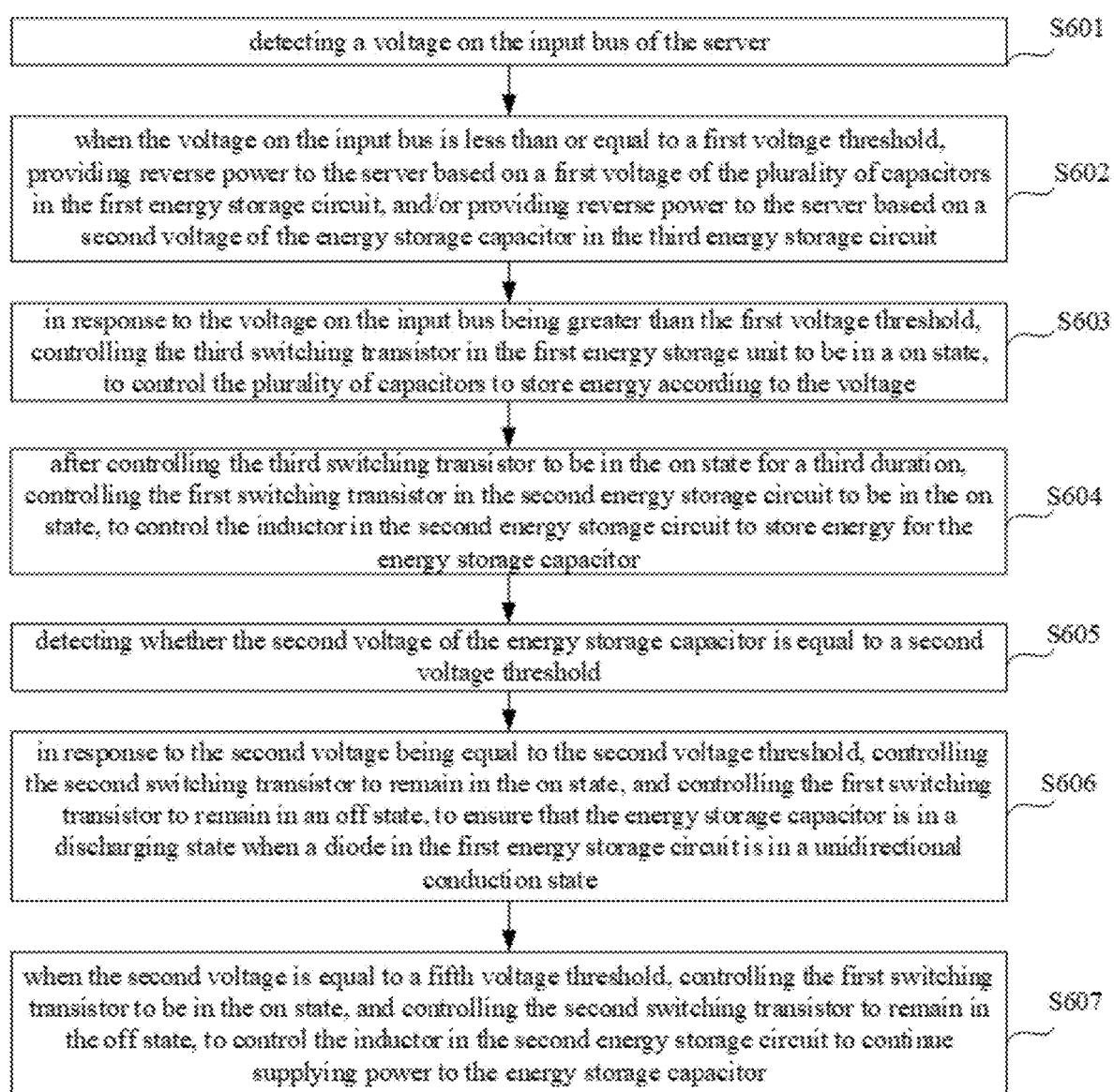
FIG. 6 is a flow chart of another power supply protection method according to an embodiment of the present application.

In this embodiment, a power supply protection method is provided, and the execution subject may be the server or the BMC deployed inside the server. FIG. 6 is a flow chart of the power supply protection method according to the embodiment of the present application, as shown in FIG. 6, which includes the following steps:

Step S601, detecting a voltage on the input bus of the server. For detailed instructions, please refer to the relevant descriptions of the corresponding steps in the above embodiments, which will not be repeated here.

Step S602, when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit. For detailed instructions, please refer to the relevant descriptions of the corresponding steps in the above embodiments, which will not be repeated here.

Step S603, in response to the voltage on the input bus being greater than the first voltage threshold, controlling the third switching transistor in the first energy storage circuit to be in a on state, to control the plurality of capacitors to store energy according to the voltage.

In the embodiment of the present application, when the voltage on the input bus is greater than the first voltage threshold, it indicates that the server is currently in a power supply state. Therefore, the third switching transistor in the first energy storage circuit is controlled to be in the on state to control the plurality of capacitors to store energy according to the voltage on the input bus, so that when the input voltage drops abnormally or malfunctions, it may use the stored electrical energy in the plurality of capacitors to supply power for the load of the server, and smooth the voltage on the input bus when using the plurality of capacitors to supply power to the server through the input bus.

Step S604, after controlling the third switching transistor to be in the on state for a third duration, controlling the first switching transistor in the second energy storage circuit to be in the on state, to control the inductor in the second energy storage circuit to store energy for the energy storage capacitor.

In the embodiment of the present application, after controlling the third switching transistor to be in the on state for the third duration, the input bus may provide stable power to the server, and then control the first switching transistor in the second energy storage circuit to be in the on state when the third switching transistor is in the on state, to control the inductor in the second energy storage circuit to store energy for the energy storage capacitor. Among them, the inductor is used to store energy to boost the voltage on the bus to the target voltage.

In some embodiments, the second energy storage circuit may be controlled to store energy for the energy storage capacitor by using the followings: controlling the first switching transistor and the second switching transistor in the third energy storage circuit alternately conduct in a specified duty cycle period for the inductor to charge the energy storage capacitor, thereby helping to balance the energy stored in the second energy storage circuit and the third energy storage circuit, avoiding excessive loss of the electrical energy, and ensuring the stability of the power-fail hold-up circuit.

The power supply protection method provided in this embodiment controls the first energy storage circuit or the third energy storage circuit in the power-fail hold-up circuit to store energy when the voltage on the input bus of the server is in the normal state. When the voltage on the input bus drops abnormally or malfunctions, it may smooth the fluctuation voltage of the input bus, thereby meeting the requirements of providing the power-fail hold-up time for the server and ensuring the safety of the server.

In some embodiments, the power supply protection method further includes:

Step S605, detecting whether the second voltage of the energy storage capacitor is equal to a second voltage threshold.

In the embodiment of the present application, detecting whether the second voltage of the energy storage capacitor is equal to the second voltage threshold is used to detect whether the energy storage capacitor reaches the saturation state during the energy storage process.

Step S606, in response to the second voltage being equal to the second voltage threshold, controlling the second switching transistor to remain in the on state, and controlling the first switching transistor to remain in an off state, to ensure that the energy storage capacitor is in a discharging state when a diode in the first energy storage circuit is in a unidirectional conduction state.

In the embodiment of the present application, by using the characteristic of high internal resistance and slow self-discharge of the energy storage capacitors, the second energy storage circuit is controlled to enter the standby shutdown self-discharge state for a long time, thereby avoiding the energy storage capacitor from continuously being in an energy storage state, reducing the overall light load power consumption of the power source and minimizing electromagnetic interference caused by the addition of the high-frequency circuits.

Step S607, when the second voltage is equal to a fifth voltage threshold, controlling the first switching transistor to be in the on state, and controlling the second switching transistor to remain in the off state, to control the inductor in the second energy storage circuit to continue supplying power to the energy storage capacitor.

In the embodiment of the present application, the fifth voltage threshold may be understood as the minimum overvoltage value of the energy storage capacitor. During the discharge process of the energy storage capacitor, when the second voltage is equal to the fifth voltage threshold, the voltage of the energy storage capacitor has reached the critical value. To avoid delayed reverse power supply and long charging time, the first switching transistor is controlled to be in the on state, and the second switching transistor is controlled to remain in the off state, to control the inductor in the second energy storage circuit to continue supplying power to the energy storage capacitor.

The power protection method provided in this embodiment may meet the requirement of providing the power-fail hold-up time for the server while avoiding excessive loss of the electrical energy, thereby helping to ensure the stability of the power-fail hold-up circuit.

In some embodiments, the inductor is an energy storage current limiting coil; the second energy storage circuit further includes: a magnetic saturation control module, an excitation saturation coil and a magnetic core; the energy storage current limiting coil, the magnetic core and the excitation saturation coil form a coupled inductor; and the magnetic saturation control module is configured for controlling a current in the excitation saturation coil, the current is used to control the energy storage current limiting coil to be in a current limiting state or control the energy storage current limiting coil to be in a saturation state. Furthermore, it may reduce the inductance requirements for the inductor and facilitate the integration design with the inductance required for current limiting of the inductor. At the same time, entering the shutdown self-discharge state for a long time may reduce the overall light load power consumption of the power source by the second energy storage circuit and minimize electromagnetic interference caused by the addition of the high-frequency circuits, thereby enhancing the stability of the server.

When the second switching transistor is in the on state and the third switching transistor is in the off state, the energy storage current limiting coil is used to charge the energy storage capacitor in the current limiting state; and when the second switching transistor is in the on state, the third switching transistor is in the off state and the diode is in the unidirectional conduction state, the energy storage capacitor is used to provide reverse power to the server when the energy storage current limiting coil is in the saturation state.

Figure 7:
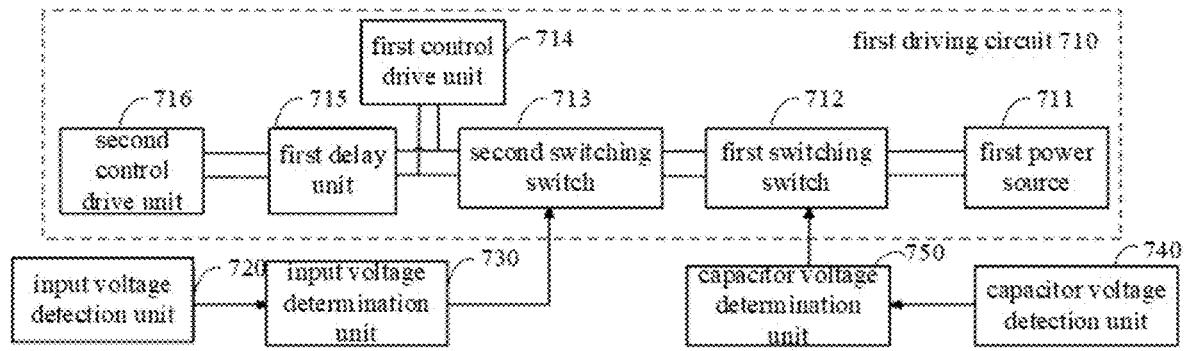
FIG. 7 is a schematic structural diagram of a power supply control circuit according to an embodiment of the present application.

Based on the same inventive concept, the present application also provides a power supply control circuit, which is used to control the aforementioned power-fail hold-up circuit to provide reverse power supply to the server. As shown in FIG. 7, the power supply control circuit includes:

a first driving circuit 710, including a first power source 711, a first switching switch 712, a second switching switch 713, a first control drive unit 714 of the third switching transistor, a first delay unit 715 and a second control drive unit 716 of the second switching transistor, wherein the first power source 711, the first switching switch 712, the second switching switch 713, the first delay unit 715 and the second control drive unit 716 are sequentially connected in series, the first control drive unit 714 is connected between the second switching switch 713 and the first delay unit 715, the first power source 711 is used to supply power to the first driving circuit 710, the first control drive unit 714 is used to control the third switching transistor to be in a on state or an off state, and the second control drive unit 716 is used to control the second switching transistor to be in the on state.

In the embodiment of the present application, the first driving circuit 710 is used to control whether the plurality of capacitors and the energy storage capacitor are connected in parallel to provide reverse power to the server.

The power supply control circuit further includes an input voltage detection unit 720, which is connected to the input bus and used to detect the voltage on the input bus.

In the embodiment of the present application, to determine whether the voltage on the input bus is abnormal, it may detect by the input voltage detection unit 720.

The power supply control circuit further includes an input voltage determination unit 730, a first end of the input voltage determination unit 730 is connected to the input voltage detection unit, a second end of the input voltage determination unit 730 is connected to the second switching switch 713, and the input voltage determination unit 730 is used to compare magnitude of a first voltage of the plurality of capacitors in the first energy storage circuit with a first voltage threshold, and used to control the second switching switch 713 to be in the on state or in the off state according to a first comparison result, and the first comparison result is a comparison result between the first voltage and the first voltage threshold.

In the embodiment of the present application, the input voltage determination unit 730 is used to control whether the second switching switch 713 is in the on state or the off state based on the magnitude between the first voltage and the first voltage threshold, and then determine whether the first control circuit may be in a conductive state.

The power supply control circuit further includes a capacitor voltage detection unit 740, which is connected to the energy storage capacitor in the third energy storage circuit, and the capacitor voltage detection unit 740 is used to detect a second voltage of the energy storage capacitor.

In the embodiment of the present application, the capacitor voltage detection unit 740 may detect whether the energy storage capacitor has reached the saturation state.

The power supply control circuit further includes a capacitor voltage determination unit 750, a first end of the capacitor voltage determination unit 750 is connected to the capacitor voltage detection unit 740, a second end of the capacitor voltage determination unit 750 is connected to the first switching switch 712, the capacitor voltage determination unit 750 is used to compare magnitude of the second voltage and a second voltage threshold, used to control the first switching switch 712 to be in the on state or control the first switching switch 712 to be in the off state according to a second comparison result; the second comparison result is a comparison result between the second voltage and the second voltage threshold.

In the embodiment of the present application, the capacitor voltage determination unit 750 is used to control whether the first switching switch 712 is in the on state or the off state based on the magnitude of the second voltage and the second voltage threshold, and then jointly determine whether the first driving circuit 710 may be in the conductive state with the second switching switch 713.

In the power supply control circuit provided in the present application, when the voltage on the input bus drops abnormally or malfunctions, hardware control may be used to provide timely power-fail protection time for the server, thereby achieving the purpose of power-fail maintenance.

Figure 8:
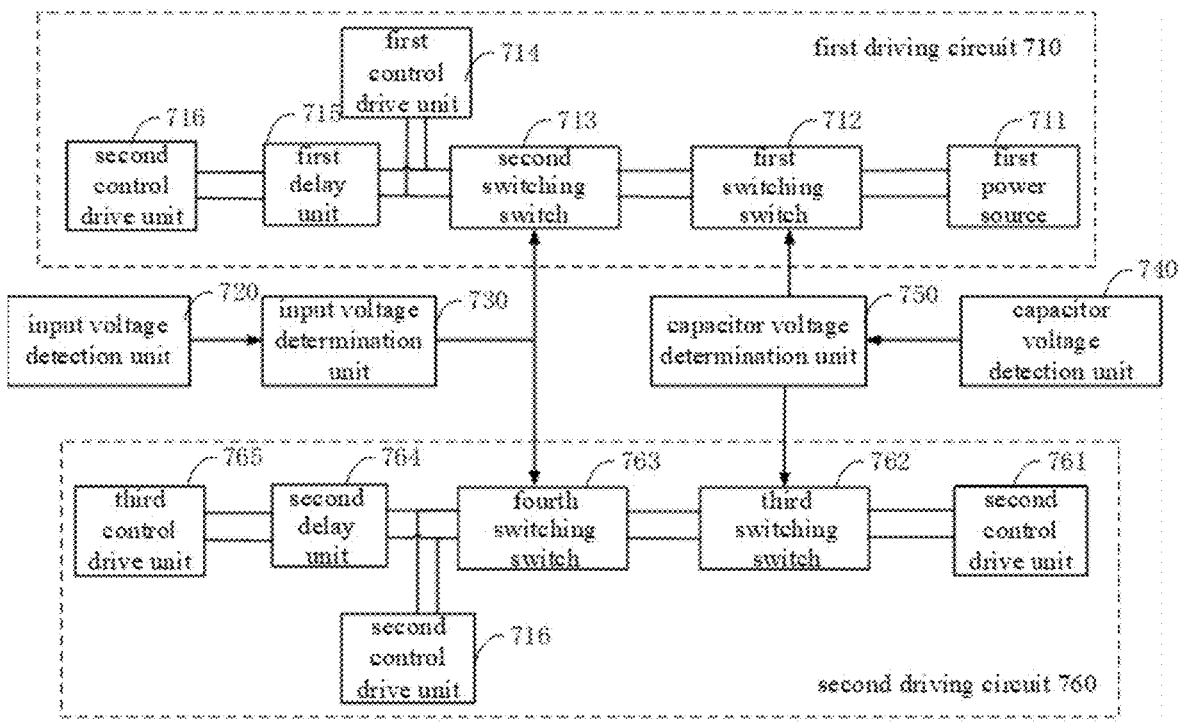
FIG. 8 is a schematic structural diagram of another power supply control circuit according to an embodiment of the present application.

As shown in FIG. 8, the power supply control circuit further includes a second driving circuit 760, and the second driving circuit 760 includes a second power source 761, a third switching switch 762, a fourth switching switch 763, the second control drive unit 716, a second delay unit 764 and a third control drive unit 765 of a fourth switching transistor, wherein the second power source 761, the third switching switch 762, the fourth switching switch 763, the second delay unit 764 and the third control drive unit 765 are sequentially connected in series, the second control drive unit 716 is connected between the third switching switch 762 and the second delay unit 764, the second power source 761 is used to supply power to the second driving circuit 760, the second control drive unit 716 is further used to control the second switching transistor to be in the off state, and the third control drive unit 765 is used to control the fourth switching transistor to be in the on state.

In the embodiment of the present application, the second driving circuit 760 is used to control whether the plurality of capacitors and the energy storage capacitor are connected in series to provide reverse power to the server.

The second end of the input voltage determination unit 730 is further connected to the fourth switching switch 763, and the input voltage determination unit 730 is further used to control the fourth switching switch 763 to be in the on state or control the fourth switching switch 763 to be in the off state according to the first comparison result.

In the embodiment of the present application, the input voltage determination unit 730 may control the on/off states of the second switching switch 713 and the fourth switching switch 763 respectively based on the magnitude of the first voltage and the first voltage threshold, thereby achieving the purpose of separately controlling the third switching transistor and the second switching transistor.

The second end of the capacitor voltage determination unit 750 is further connected to the third switching switch 762, and the capacitor voltage determination unit 750 is further used to control the third switching switch 762 to be in the on state or control the third switching switch 762 to be in the off state according to the second comparison result.

In the embodiment of the present application, the capacitor voltage determination unit 750 may control the on/off states of the first switching switch 712 and the third switching switch 762 respectively based on the magnitude of the second voltage and the second voltage threshold, thereby achieving the purpose of separately controlling the second switching transistor and the fourth switching transistor.

In some implementation scenarios, the input voltage determination unit 730 controls the second switching switch 713 to be in the on state when the first comparison result indicates that the first voltage is greater than the first voltage threshold, to send a first control signal to the second control drive unit 716, and the second control drive unit 716 controls the third switching transistor to be in the on state according to the first control signal;

the input voltage determination unit 730 controls the second switching switch 713 to be in the on state when the first comparison result indicates that the first voltage is equal to the first voltage threshold, to send a second control signal to the second control drive unit 716, and the second control drive unit 716 controls the third switching transistor to be in the off state according to second control signal;

the input voltage determination unit 730 controls the second switching switch 713 to be in the off state when the first comparison result indicates that the first voltage is less than the first voltage threshold and the first voltage is greater than a third voltage threshold, to keep the third switching transistor in the off state; and the input voltage determination unit 730 controls the fourth switching switch 763 to be in the on state when the first comparison result indicates that the first voltage is equal to the third voltage threshold, to send a third control signal to the second control drive unit, and the third control signal is used to control the second switching transistor to be in the off state.

In some other implementation scenarios, the capacitor voltage determination unit 750 controls the first switching switch 712 to be in the on state when the second comparison result indicates that the second voltage is equal to the second voltage threshold, to send a fourth control signal to the second control drive unit 716 through the first delay unit 715, the second control drive unit 716 controls the second switching transistor to be in the on state according to the fourth control signal, and the first delay unit 715 is used to delay the fourth control signal for a first duration and then send the fourth control signal to the second control drive unit;

the capacitor voltage determination unit 750 controls the first switching switch 712 to be in the on state when the second comparison result indicates that the second voltage is less than the first voltage threshold and the second voltage is greater than a fourth voltage threshold, and the second control drive unit 716 continuously controls the second switching transistor to be in the on state according to the fourth control signal; and the capacitor voltage determination unit 750 controls the first switching switch 712 to be in the off state when the second comparison result indicates that the second voltage is less than or equal to the fourth voltage threshold, to stop sending the fourth control signal to the second control drive unit 716, and controls the third switching switch 762 to be in the on state to send a fifth control signal to the third control drive unit 765 through the second delay unit 764, the fifth control signal is used to control the third switching transistor 762 to be in the on state, and the second delay unit 764 is used to delay the fifth control signal for a second duration and then send the fifth control signal to the third control drive unit 765.

In the power supply control circuit provided in the present application, voltage comparison is used to quickly determine the voltage states of the plurality of capacitors and the energy storage capacitor, which in turn helps to switch the circuit timely, smooth the fluctuation voltage of the input bus, and extend the power-fail protection time.

In some implementation scenarios, when the first switching switch 712 and the second switching switch 713 are both in the on state, the first driving circuit 710 is in a conductive state; and when the third switching switch 762 and the fourth switching switch 763 are both in the on state, the second driving circuit 760 is in the conductive state. The fact that both the first driving circuit 710 and the second driving circuit 760 are in the conductive state is a mutually exclusive event. That is, when the first driving circuit 710 is in the conductive state, the second driving circuit 760 must be in the open state. But when the first driving circuit 710 is in an open state, the second driving circuit 760 may not necessarily be in the open state. When the second driving circuit 760 is in the conductive state, the first driving circuit 710 must be in the open state. But when the second driving circuit 760 is in the open state, the first driving circuit 710 may not necessarily be in the open state. Therefore, by combining the states of the first voltage and the second voltage, targeted control may be carried out on the power-fail hold-up circuit, so as to make reasonable use of the first voltage and the second voltage, effectively extending the power-fail protection time, and enabling the server to achieve the purpose of power-fail maintenance.

In some implementation scenarios, when the third switching transistor and the second switching transistor are both in the on state, and the first switching transistor in the second energy storage circuit and the fourth switching transistor are both in the off state, the plurality of capacitors are connected in parallel with the energy storage capacitor;

when the second switching transistor and the fourth switching transistor are both in the on state, and the first switching transistor and the third switching transistor are both in the off state, the plurality of capacitors are connected in series with the energy storage capacitor.

By using the above power supply control circuit to control the power-fail hold-up circuit to provide reverse power supply to the server, it helps to shorten the control time, achieve fast switching, and respond quickly to the power demand on the load side, thereby improving efficiency and ensuring the demand that the server needs sufficient power-fail protection time.

Figure 9:
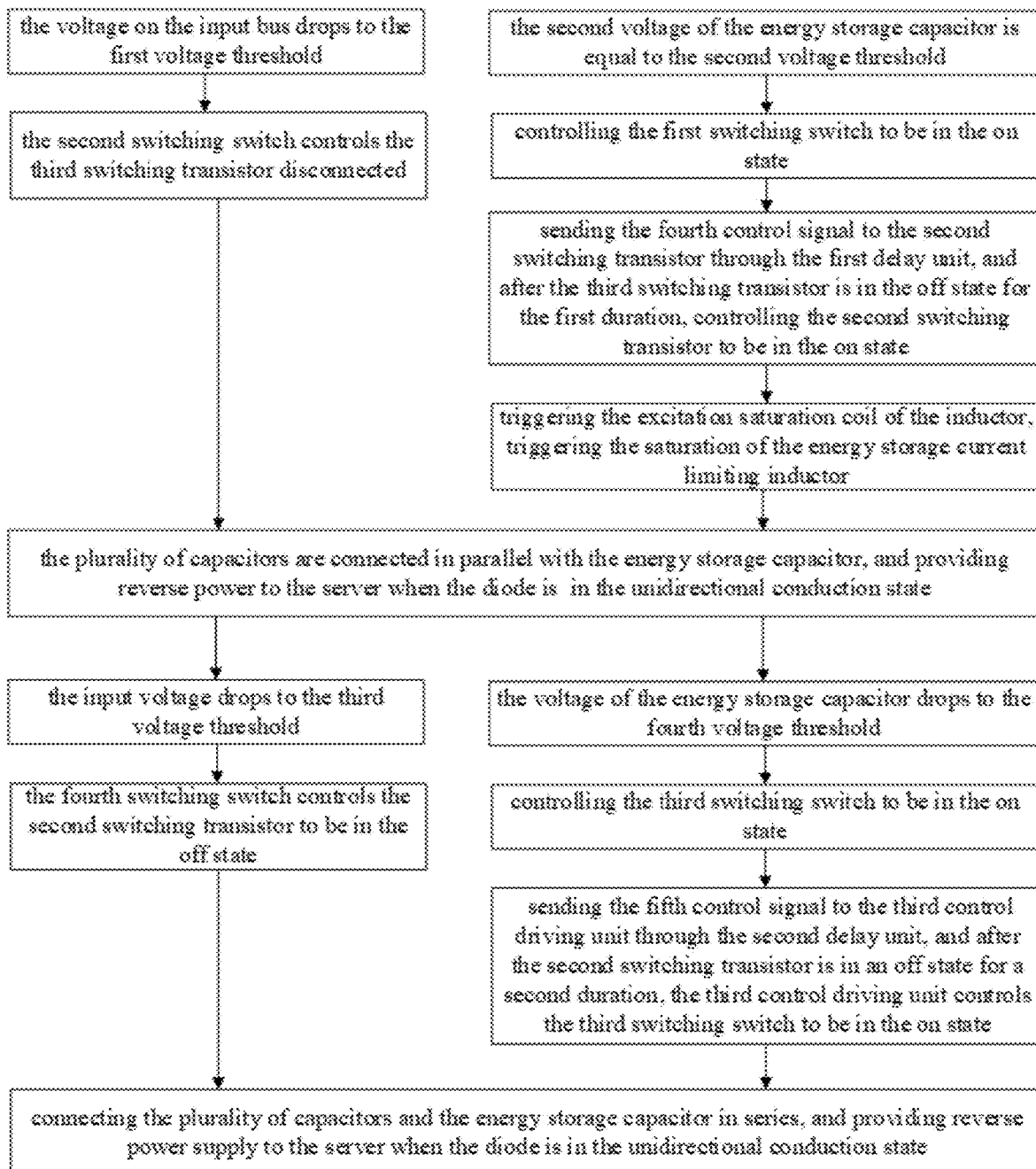
FIG. 9 is a working timing diagram for providing reverse power to the server according to an embodiment of the present application.

In some implementation scenarios, by the power-fail hold-up circuit shown in FIG. 4 combined with the power supply control circuit shown in FIG. 8, the working timing of controlling the power-fail hold-up circuit to provide reverse power supply to the server may be shown in FIG. 9:

1) The input voltage determination unit determines whether the voltage on the input bus drops to the first voltage threshold. When the voltage on the input bus drops to the first voltage threshold, the second switching switch 713 is controlled to be in the on state, and then the second control signal is sent to the second control driving unit 716, so that the second control driving unit 716 controls the third switching transistor Q1 to be in the off state according to the second control signal.

2) At the same time, the capacitor voltage determination unit 750 determines that the second voltage of the energy storage capacitor is equal to the second voltage threshold. When it is detected that the second voltage of the energy storage capacitor is equal to the second voltage threshold, it controls the first switching switch 712 to be in the on state, and then sends the fourth control signal to the second switching transistor Q4 through the first delay unit. After the third switching transistor Q1 is in the off state for the first duration, it controls the second switching transistor Q4 to be in the on state, and controls the current in the excitation saturation coil L2 by the magnetic saturation control module 40, to control the energy storage current limiting coil L1 to be in the saturation state. At this point, both the first switching switch 712 and the second switching switch 713 are in the on state, which enables the plurality of capacitors 11 to be connected in parallel with the energy storage capacitor C3, and when the diode D1 is in the unidirectional conduction state, it may achieve the purpose of providing reverse power to the server.

3) During the discharge process of the plurality of capacitors 11 and the energy storage capacitor C3, the input voltage detection unit 720 detects whether the first voltage reaches the third voltage threshold, and the capacitor voltage detection unit 740 detects whether the second voltage reaches the fourth voltage threshold. In response to the first voltage not reaching the third voltage threshold and/or the second voltage not reaching the fourth voltage threshold, the plurality of capacitors 11 are continuously connected in parallel with the energy storage capacitor C3, and the diode D1 is in the unidirectional conduction state to continuously provide reverse power supply to the server. Due to the existence of a discharge path when the voltage on the input bus is in a power-fail state, the time requirement for the instantaneous switching of the energy storage capacitor may be reduced, ensuring the reliability of the switching state.

4) When the input voltage detection unit 720 detects that the first voltage reaches the third voltage threshold, and the capacitor voltage detection unit 740 detects that the second voltage reaches the fourth voltage threshold, the input voltage detection unit 720 controls the fourth switching switch 763 to be in the on state, and then sends the third control signal to the second control driving unit 716, so that the second control driving unit 716 controls the second switching transistor Q4 to be the off state. The capacitor voltage detection unit 740 controls the first switching switch 712 to be in the off state to stop sending the fourth control signal to the second control driving unit 716, thereby ensuring that the second switching transistor Q4 is in the off state. The capacitor voltage detection unit 740 is also used to control the third switching switch 762 to be in a conducting state, so as to send the fifth control signal to the third control driving unit 765 through the second delay unit 764. After the second switching transistor Q4 is in an off state for a second duration, the third control driving unit 765 controls the third switching switch 762 to be in the on state, thereby achieving the purpose of connecting the plurality of capacitors 11 and the energy storage capacitor C3 in series, and providing reverse power supply to the server when the diode is in the unidirectional conduction state, to fully utilize the electrical energy in the plurality of capacitors 11 and the energy storage capacitor C3, and extend the duration of providing power-fail hold-up time for the server. Moreover, when the energy storage capacitor C3 is connected in series with the plurality of capacitors 11 to release energy, the large capacitor on the input bus may be cut off during the process of switching the power supply circuit of the server to a power-fail hold-up circuit to supply power to the server. This ensures that there are no large-capacitance energy storage capacitors on the branch of the input bus, and when the power supply circuit is switched, the surge energy on the input bus is small and has a short existence time, and the current limiting resistor R1 also has a current limiting effect, effectively ensuring the safety of providing reverse power supply to the server.

In this embodiment, a power supply protection apparatus is also provided, which is used to implement the above embodiments and preferred embodiments. Those that have already been described will not be repeated. As used below, the term "module" may refer to a combination of a software and/or hardware that implements predetermined functions. Although the apparatus described in the following embodiments are preferably implemented in the software, however, implementation by the hardware or a combination of the software and the hardware is also possible and envisioned.

Figure 10:
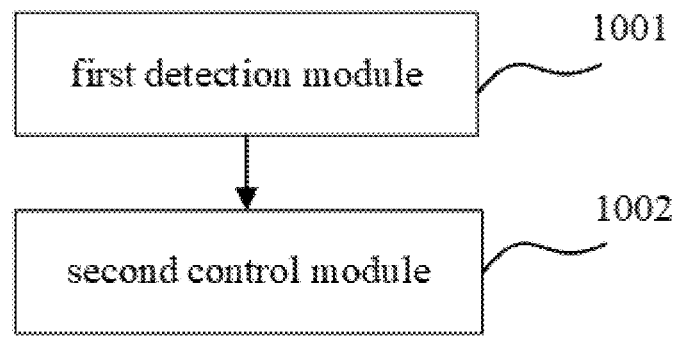
FIG. 10 shows a power supply protection apparatus according to an embodiment of the present application.

This embodiment provides a power supply protection apparatus, as shown in FIG. 10, the power supply protection apparatus includes:

a first detection module 1001, configured for detecting a voltage signal on the input bus of the server; and a first control module 1002 configured for, when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit.

In some embodiments, the plurality of capacitors includes a first capacitor and a second capacitor connected in parallel with the first capacitor; the first energy storage circuit further includes: a third switching transistor and a diode; the first capacitor and the third switching transistor are sequentially connected in series between the positive pole of the input bus and the negative pole of the input bus; a positive pole of the diode is connected to the negative pole of the input bus; and the second capacitor is connected in series between the positive pole of the input bus and a negative pole of the diode.

The first control module 1002 includes:
a first control unit configured for, when the voltage on the input bus is equal to the first voltage threshold and the second voltage of the energy storage capacitor is equal to a second voltage threshold, controlling the third switching transistor to be in an off state, to provide reverse power to the server based on the first voltage of the first capacitor and the second capacitor when the diode is in a unidirectional conduction state.

In some embodiments, the first control module 1002 further includes:
a second control unit configured for, when the voltage on the input bus is less than the first voltage threshold, the voltage on the input bus is greater than a third voltage threshold, and the second voltage is equal to the second voltage threshold, after controlling the third switching transistor to be in the off state for a first duration, controlling the second switching transistor in the third energy storage circuit to be in a on state, and when the first switching transistor in the second energy storage circuit is in the off state and the diode is in the unidirectional conduction state, controlling the plurality of capacitors to be connected in parallel with the energy storage capacitor, to provide reverse power to the server from the first voltage and the second voltage.

In some embodiments, the power-fail hold-up circuit further includes: a current limiting resistor and a fourth switching transistor; one end of the current limiting resistor is disposed between the second switching transistor and the energy storage capacitor; and the fourth switching transistor is connected in series between the other end of the current limiting resistor and the negative pole of the diode.

The first control module 1002 further includes:
a third control unit configured for, when the voltage on the input bus is equal to the third voltage threshold, the second voltage is less than the second voltage threshold and the second voltage is greater than a fourth voltage threshold, continuing to control the plurality of capacitors to be connected in parallel with the energy storage capacitor, to provide reverse power to the server from the first voltage and the second voltage; and
a fourth control unit configured for, when the voltage on the input bus is equal to the third voltage threshold and the second voltage is equal to the fourth voltage threshold, controlling the second switching transistor to be in the off state, controlling the fourth switching transistor to be in the on state after controlling the second switching transistor to be in the off state for a second duration, and controlling the plurality of capacitors to be connected in series with the energy storage capacitor when the first switching transistor and the third switching transistor are in the off state and the diode is in the unidirectional conduction state, to provide reverse power to the server from the first voltage and the second voltage.

In some embodiments, the apparatus further includes:
a fifth control module configured for, in response to the voltage on the input bus being greater than the first voltage threshold, controlling the third switching transistor in the first energy storage circuit to be in a on state, to control the plurality of capacitors to store energy according to the voltage; and
a sixth control module configured for, after controlling the third switching transistor to be in the on state for a third duration, controlling the first switching transistor in the second energy storage circuit to be in the on state, to control the inductor in the second energy storage circuit to store energy for the energy storage capacitor, wherein the inductor is used to store energy to boost the voltage on the input bus to the target voltage.

In some embodiments, controlling the inductor in the second energy storage circuit to store energy for the energy storage capacitor using the following ways:
controlling the first switching transistor and the second switching transistor in the third energy storage circuit alternately conduct in a specified duty cycle period for the inductor to charge the energy storage capacitor.

In some embodiments, the apparatus further includes:
a second detection module configured for, detecting whether the second voltage of the energy storage capacitor is equal to a second voltage threshold;
a seventh control module configured for, in response to the second voltage being equal to the second voltage threshold, controlling the second switching transistor to remain in the on state, and controlling the first switching transistor to remain in an off state, to ensure that the energy storage capacitor is in a discharging state when a diode in the first energy storage circuit is in a unidirectional conduction state; and
an eighth control module configured for, when the second voltage is equal to a fifth voltage threshold, controlling the first switching transistor to be in the on state, and controlling the second switching transistor to remain in the off state, to control the inductor in the second energy storage circuit to continue supplying power to the energy storage capacitor.

In some embodiments, the inductor is an energy storage current limiting coil; the second energy storage circuit further includes: a magnetic saturation control module, an excitation saturation coil and a magnetic core; the energy storage current limiting coil, the magnetic core and the excitation saturation coil form a coupled inductor; and the magnetic saturation control module is configured for controlling a current in the excitation saturation coil, the current is used to control the energy storage current limiting coil to be in a current limiting state or control the energy storage current limiting coil to be in a saturation state.

In some embodiments, when the second switching transistor is in the on state and the third switching transistor is in the off state, the energy storage current limiting coil is used to charge the energy storage capacitor in the current limiting state; and
when the second switching transistor is in the on state, the third switching transistor is in the off state and the diode is in the unidirectional conduction state, the energy storage capacitor is used to provide reverse power to the server when the energy storage current limiting coil is in the saturation state.

The further functional descriptions of the above modules and units are the same as the corresponding embodiments, and will not be repeated here.

The power protection apparatus in this embodiment is presented in the form of functional units, which refer to ASIC (Application Specific Integrated Circuit) circuits, processors and memories that execute one or more software or fixed programs, and/or other devices that may provide the above functions.

The further functional descriptions of the above modules and units are the same as the corresponding embodiments, and will not be repeated here.

The embodiment of the present application also provides a server with the power supply protection apparatus shown in FIG. 10.

Figure 11:
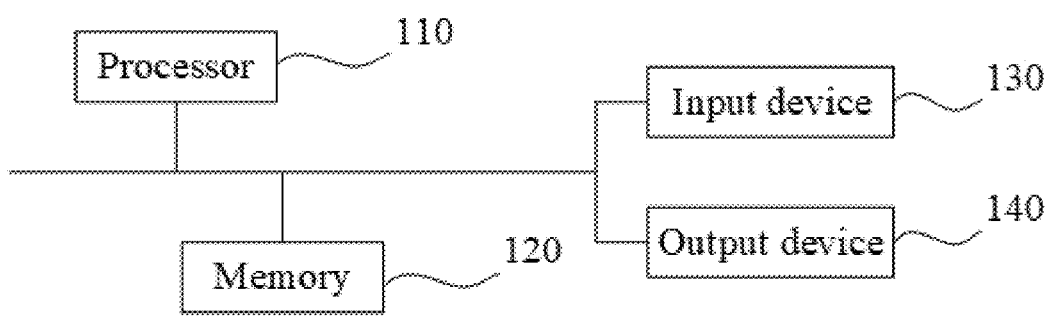
FIG. 11 is a schematic diagram of a hardware structure of the server according to an embodiment of the present application.
Figure 12:
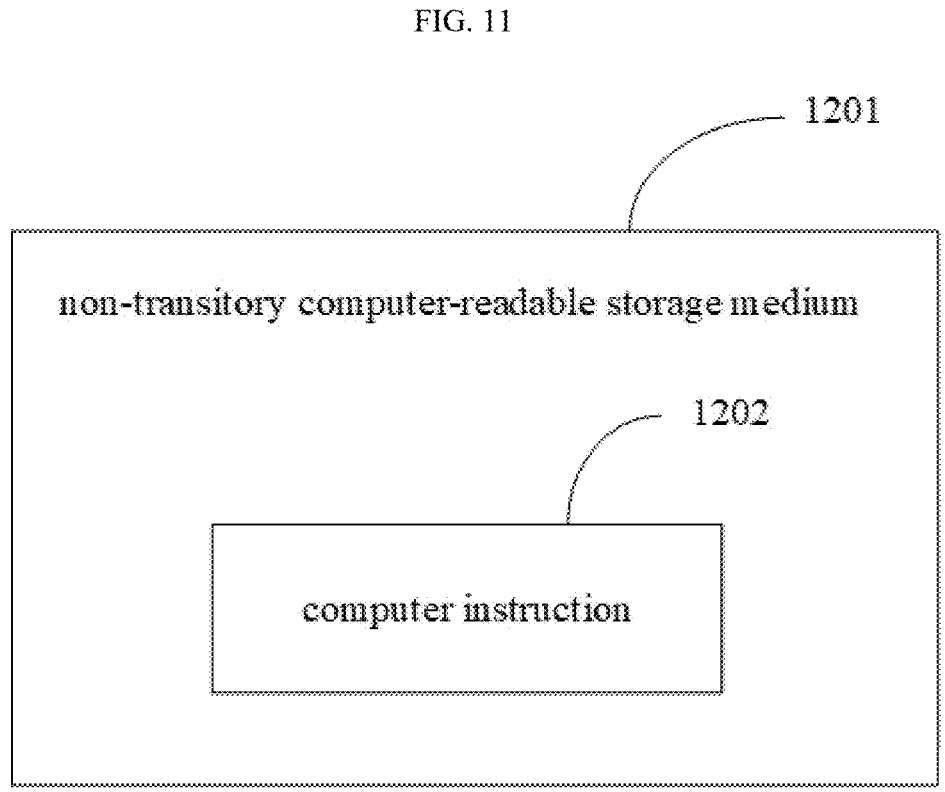
FIG. 12 is a schematic structural diagram of a non-transitory computer-readable storage medium according to an embodiment of the present application.

Referring to FIG. 11, FIG. 11 is a schematic structural diagram of a server provided by an embodiment of the present application. As shown in FIG. 11, the server includes one or more processors 110, a memory 120, and interfaces for connecting various components, including high-speed interfaces and low-speed interfaces. The components are connected to each other through different buses and may be installed on a common motherboard or in other ways as needed. The processor may process instructions executed within the server, including instructions stored in or on the memory to display graphical information of a GUI (Graphical User Interface) on external input/output devices such as display devices coupled to the interfaces. In some embodiments, multiple processors and/or multiple buses may be used together with multiple memories if necessary. Similarly, multiple servers may be connected, and each device provides some necessary operations (such as serving as a server array, a set of blade servers, or a multiprocessor system). Taking one processor 110 as an example in FIG. 11.

The processor 110 may be a central processing unit, a network processor, or a combination thereof. Among them, the processor 110 may further include hardware chips. The above hardware chips may be application specific integrated circuits, programmable logic devices, or a combination thereof. The above-mentioned programmable logic devices may be complex programmable logic devices, field programmable logic gate arrays, general-purpose array logic, or any combination thereof.

Among them, the memory 120 stores instructions that may be executed by at least one processor 110 to enable at least one processor 110 to execute the methods shown in the above embodiments.

The memory 120 may include a storage program area and a storage data area, among them, the storage program area may store an operating system and at least one application program required for a function. The storage data area may store data created based on server usage. In addition, the memory 120 may include the high-speed random access memory, as well as the non-transitory memory such as at least one disk storage device, flash memory device, or other non-transitory solid-state storage device. In some embodiments, the memory 120 may include a remote memory set relative to the processor 110, which may be connected to the server through a network. Examples of the above networks include but are not limited to the Internet, enterprise intranet, local area network, mobile communication network and their combinations.

The memory 120 may include transitory memory, such as random access memory. The memory may also include non-transitory memory, such as flash memory, hard drives, or solid-state drives. The memory 120 may also include a combination of the above-mentioned types of memory.

The server also includes an input device 130 and an output device 140. The processor 110, the memory 120, the input device 130, and the output device 140 may be connected through a bus or other means, as shown in FIG. 11 for example.

The input device 130 may receive input numerical or character information, as well as generate key signal inputs related to user settings and functional controls of the server, such as touch screens, keyboards, mouse, trackpads, touchpads, indicator sticks, one or more mouse buttons, trackballs, joysticks, etc. The output device 140 may include display devices, auxiliary lighting devices (such as LEDs), and tactile feedback devices (such as vibration motors), etc. The above display devices include but are not limited to liquid crystal displays, light-emitting diodes, displays, and plasma displays. In some embodiments, the display device may be a touch screen.

The embodiments of the present application also provide a non-transitory computer-readable storage medium 1201. The method according to the embodiments of the present application may be implemented in the hardware, the firmware, or as a computer instruction 1202 that may be recorded on a storage medium, or downloaded through a network and originally stored on a remote storage medium or non-transitory machine-readable storage medium and will be stored on a local storage medium. Therefore, the method described herein may be processed by the software stored on the storage media using general-purpose computers, dedicated processors, or programmable or dedicated hardware. Among them, the storage medium may be magnetic disk, optical disk, read-only storage memory, random access memory, flash memory, hard disk or solid-state drive, etc. Furthermore, the storage medium may also include a combination of the above-mentioned types of memory. It may be understood that computers, processors, microprocessor controllers, or programmable hardware include storage components that may store or receive the software or the computer instructions. When the software or the computer instructions are accessed and executed by the computers, the processors, or the hardware, the methods shown in the above embodiments are implemented.

Although the embodiments of the present application have been described in conjunction with the accompanying drawings, those skilled in the art may make various modifications and variations without departing from the spirit and scope of the present application, and such modifications and variations fall within the scope defined by the appended claims.

The invention claimed is:
1. A power-fail hold-up circuit, comprising:
a first energy storage circuit, comprising a plurality of capacitors connected in parallel, wherein the plurality of capacitors are used to store energy according to a voltage of an input bus of a server and to provide reverse power to the server; the plurality of capacitors comprises a first capacitor and a second capacitor connected in parallel with the first capacitor; the first energy storage circuit further comprises: a third switching transistor and a diode; the first capacitor and the third switching transistor are sequentially connected in series between the positive pole of the input bus and the negative pole of the input bus; a positive pole of the diode is connected to the negative pole of the input bus;

and the second capacitor is connected in series between the positive pole of the input bus and a negative pole of the diode;

a second energy storage circuit, comprising an inductor and a first switching transistor, wherein the inductor and the first switching transistor are sequentially connected in series between a positive pole of the input bus and a negative pole of the input bus, and the inductor is used to store energy to boost the voltage to a target voltage; and a third energy storage circuit, comprising a second switching transistor and an energy storage capacitor, wherein the second switching transistor and the energy storage capacitor are sequentially connected in series between the inductor and the negative pole of the input bus, the inductor is used to charge the energy storage capacitor, and the energy storage capacitor provides reverse power to the server.

2. The power-fail hold-up circuit according to claim 1, wherein the first capacitor and the second capacitor are used to store energy according to the voltage of the input bus of the server when the third switching transistor is in a on state; and the first capacitor and the second capacitor are further used to provide reverse power to the server when the third switching transistor is in an off state and the diode is in a unidirectional conduction state.

3. The power-fail hold-up circuit according to claim 2, wherein when the third switching transistor is in the on state, the first switching transistor and the second switching transistor alternately conduct in a specified duty cycle period for the inductor to charge the energy storage capacitor.

4. The power-fail hold-up circuit according to claim 1, wherein the power-fail hold-up circuit further comprises a current limiting resistor and a fourth switching transistor;

one end of the current limiting resistor is disposed between the second switching transistor and the energy storage capacitor; and the fourth switching transistor is connected in series between the other end of the current limiting resistor and the negative pole of the diode.

5. The power-fail hold-up circuit according to claim 4, wherein when the second switching transistor is in a on state, and the first switching transistor, the third switching transistor and the fourth switching transistor are in an off state, the energy storage capacitor and the plurality of capacitors are connected in parallel to provide reverse power to the server; and when the first switching transistor, the second switching transistor and the third switching transistor are in the off state, the fourth switching transistor is in the on state and the diode is in a unidirectional conduction state, the energy storage capacitor and the plurality of capacitors are connected in series to provide reverse power to the server.

6. The power-fail hold-up circuit according to claim 2, wherein the inductor is an energy storage current limiting coil; and the second energy storage circuit further comprises: a magnetic saturation control module, an excitation saturation coil and a magnetic core;

the energy storage current limiting coil, the magnetic core and the excitation saturation coil form a coupled inductor; and the magnetic saturation control module is configured for controlling a current in the excitation saturation coil, the current is used to control the energy storage current limiting coil to be in a current limiting state or control the energy storage current limiting coil to be in a saturation state.

7. The power-fail hold-up circuit according to claim 6, wherein when the second switching transistor is in a on state and the third switching transistor is in an off state, the energy storage current limiting coil is used to charge the energy storage capacitor in the current limiting state; and when the second switching transistor is in the on state, the third switching transistor is in the off state and the diode is in a unidirectional conduction state, the energy storage capacitor is used to provide reverse power to the server when the energy storage current limiting coil is in the saturation state.

8. A power supply protection method, applied to the power-fail hold-up circuit according to claim 1, wherein the method comprises:

detecting a voltage on the input bus of the server; and when the voltage on the input bus is less than or equal to a first voltage threshold, providing reverse power to the server based on a first voltage of the plurality of capacitors in the first energy storage circuit, and/or providing reverse power to the server based on a second voltage of the energy storage capacitor in the third energy storage circuit; the plurality of capacitors comprises a first capacitor and a second capacitor connected in parallel with the first capacitor; the first energy storage circuit further comprises: a third switching transistor and a diode; the first capacitor and the third switching transistor are sequentially connected in series between the positive pole of the input bus and the negative pole of the input bus; a positive pole of the diode is connected to the negative pole of the input bus; and the second capacitor is connected in series between the positive pole of the input bus and a negative pole of the diode.

9. The method according to claim 8, wherein when the voltage on the input bus is equal to a first voltage threshold, providing reverse power to the server based on a first voltage of the plurality of capacitors in the first energy storage circuit comprises:

when the voltage on the input bus is equal to the first voltage threshold and the second voltage of the energy storage capacitor is equal to a second voltage threshold, controlling the third switching transistor to be in an off state, to provide reverse power to the server based on the first voltage of the first capacitor and the second capacitor when the diode is in a unidirectional conduction state.

10. The method according to claim 9, wherein when the voltage on the input bus is less than the first voltage threshold, providing reverse power to the server based on the first voltage of the plurality of capacitors in the first energy storage circuit and the second voltage of the energy storage capacitor in the third energy storage circuit comprises:

when the voltage on the input bus is less than the first voltage threshold, the voltage on the input bus is greater than a third voltage threshold, and the second voltage is equal to the second voltage threshold, after controlling the third switching transistor to be in the off state for a first duration, controlling the second switching transistor in the third energy storage circuit to be in a on state, and when the first switching transistor in the second energy storage circuit is in the off state and the diode is in the unidirectional conduction state, controlling the plurality of capacitors to be connected in parallel with the energy storage capacitor, to provide reverse power to the server from the first voltage and the second voltage.

11. The method according to claim 10, wherein
the power-fail hold-up circuit further comprises: a current limiting resistor and a fourth switching transistor; one end of the current limiting resistor is disposed between the second switching transistor and the energy storage capacitor; and the fourth switching transistor is connected in series between the other end of the current limiting resistor and the negative pole of the diode;
when the voltage on the input bus is less than the first voltage threshold, providing reverse power to the server based on the first voltage of the plurality of capacitors in the first energy storage circuit and the second voltage of the energy storage capacitor in the third energy storage circuit comprises:
when the voltage on the input bus is equal to the third voltage threshold, the second voltage is less than the second voltage threshold and the second voltage is greater than a fourth voltage threshold, continuing to control the plurality of capacitors to be connected in parallel with the energy storage capacitor, to provide reverse power to the server from the first voltage and the second voltage; and
when the voltage on the input bus is equal to the third voltage threshold and the second voltage is equal to the fourth voltage threshold, controlling the second switching transistor to be in the off state, controlling the fourth switching transistor to be in the on state after controlling the second switching transistor to be in the off state for a second duration, and controlling the plurality of capacitors to be connected in series with the energy storage capacitor when the first switching transistor and the third switching transistor are in the off state and the diode is in the unidirectional conduction state, to provide reverse power to the server from the first voltage and the second voltage.

12. The method according to claim 8, further comprising:
in response to the voltage on the input bus being greater than the first voltage threshold, controlling the third switching transistor in the first energy storage unit to be in a on state, to control the plurality of capacitors to store energy according to the voltage; and
after controlling the third switching transistor to be in the on state for a third duration, controlling the first switching transistor in the second energy storage circuit to be in the on state, to control the inductor in the second energy storage circuit to store energy for the energy storage capacitor, wherein the inductor is used to store energy to boost the voltage on the input bus to the target voltage.

13. The method according to claim 12, wherein controlling the second energy storage circuit to store energy for the energy storage capacitor comprises:
controlling the first switching transistor and the second switching transistor in the third energy storage circuit alternately conduct in a specified duty cycle period for the inductor to charge the energy storage capacitor.

14. The method according to claim 13, further comprising:
detecting whether the second voltage of the energy storage capacitor is equal to a second voltage threshold;
in response to the second voltage being equal to the second voltage threshold, controlling the second switching transistor to remain in the on state, and controlling the first switching transistor to remain in an off state, to ensure that the energy storage capacitor is in a discharging state when a diode in the first energy storage circuit is in a unidirectional conduction state; and
when the second voltage is equal to a fifth voltage threshold, controlling the first switching transistor to be in the on state, and controlling the second switching transistor to remain in the off state, to control the inductor in the second energy storage circuit to continue supplying power to the energy storage capacitor.

15. The method according to claim 14, wherein
the inductor is an energy storage current limiting coil; the second energy storage circuit further comprises: a magnetic saturation control module, an excitation saturation coil and a magnetic core; the energy storage current limiting coil, the magnetic core and the excitation saturation coil form a coupled inductor; and the magnetic saturation control module is configured for controlling a current in the excitation saturation coil, the current is used to control the energy storage current limiting coil to be in a current limiting state or control the energy storage current limiting coil to be in a saturation state.

16. The method according to claim 15, wherein
when the second switching transistor is in the on state and the third switching transistor is in the off state, the energy storage current limiting coil is used to charge the energy storage capacitor in the current limiting state; and
when the second switching transistor is in the on state, the third switching transistor is in the off state and the diode is in the unidirectional conduction state, the energy storage capacitor is used to provide reverse power to the server when the energy storage current limiting coil is in the saturation state.

17. A power supply control circuit, wherein the power supply control circuit is used to control a power-fail hold-up circuit to provide reverse power to the server, the power-fail hold-up circuit is the power-fail hold-up circuit according to claim 1, and the power supply control circuit comprises:
a first driving circuit, comprising a first power source, a first switching switch, a second switching switch, a first control drive unit of the third switching transistor, a first delay unit and a second control drive unit of the second switching transistor, wherein the first power source, the first switching switch, the second switching switch, the first delay unit and the second control drive unit are sequentially connected in series, the first control drive unit is connected between the second switching switch and the first delay unit, the first power source is used to supply power to the first driving circuit, the first control drive unit is used to control the third switching transistor to be in a on state or an off state, and the second control drive unit is used to control the second switching transistor to be in the on state;
an input voltage detection unit, connected to the input bus, and used to detect a voltage on the input bus;
an input voltage determination unit, wherein a first end of the input voltage determination unit is connected to the input voltage detection unit, a second end of the input voltage determination unit is connected to the second switching switch, and the input voltage determination unit is used to compare magnitude of a first voltage of the plurality of capacitors in the first energy storage circuit with a first voltage threshold, and used to control the second switching switch to be in the on state or control the second switching switch to be in the off state according to a first comparison result, wherein the first comparison result is a comparison result between the first voltage and the first voltage threshold;
a capacitor voltage detection unit, connected to the energy storage capacitor in the third energy storage circuit, wherein the capacitor voltage detection unit is used to detect a second voltage of the energy storage capacitor; and
a capacitor voltage determination unit, wherein a first end of the capacitor voltage determination unit is connected to the capacitor voltage detection unit, a second end of the capacitor voltage determination unit is connected to the second switching switch, the capacitor voltage determination unit is used to compare magnitude of the second voltage and a second voltage threshold, used to control the first switching switch to be in the on state or control the first switching switch to be in the off state according to a second comparison result; the second comparison result is a comparison result between the second voltage and the second voltage threshold.

18. The power supply control circuit according to claim 17, further comprising:
a second driving circuit, comprising a second power source, a third switching switch, a fourth switching switch, the second control drive unit, a second delay unit and a third control drive unit of a fourth switching transistor, wherein the second power source, the third switching switch, the fourth switching switch, the second delay unit and the third control drive unit are sequentially connected in series, the second control drive unit is connected between the third switching switch and the second delay unit, the second power source is used to supply power to the second driving circuit, the second control drive unit is further used to control the second switching transistor to be in the off state, and the third control drive unit is used to control the fourth switching transistor to be in the on state;
the second end of the input voltage determination unit is further connected to the fourth switching switch, and the input voltage determination unit is further used to control the fourth switching switch to be in the on state or control the fourth switching switch to be in the off state according to the first comparison result; and
the second end of the capacitor voltage determination unit is further connected to the third switching switch, and the capacitor voltage determination unit is further used to control the fourth switching switch to be in the on state or control the fourth switching switch to be in the off state according to the second comparison result.

19. A server, comprising:
a memory and a processor, wherein the memory and the processor are connected in communication with each other, computer instructions are stored in the memory, and the processor, by executing the computer instructions, executes the power supply protection method according to claim 8.

20. A computer-readable storage medium, wherein the computer-readable storage medium stores computer instructions for causing a computer to execute the power supply protection method according to claim 8.

* * * * *